Feb. 4, 1941. J. A. GREENE 2,230,747
LIQUID COATING COMPOSITION AND METHOD OF PRODUCING THE SAME
Filed Nov. 27, 1939
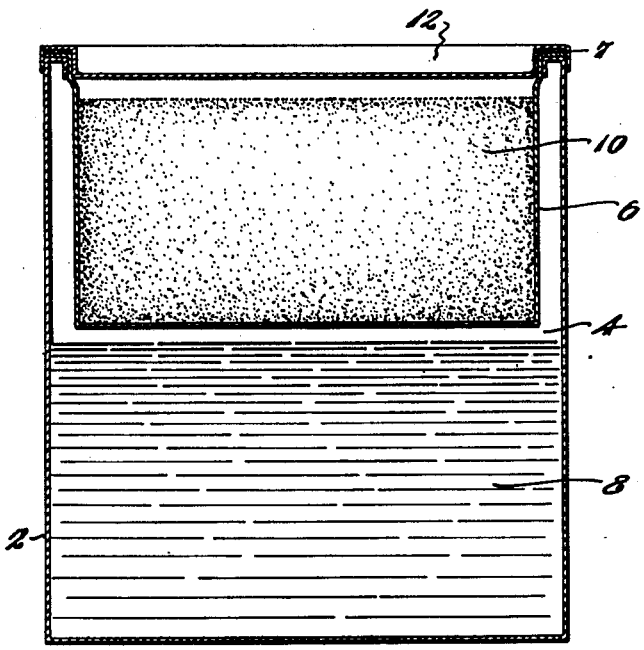
Inventor
J.A. Greene
By Robert Robb
Attorneys

106. COMPOSITIONS, COATING OR PLASTIC.

Patented Feb. 4, 1941

2,230,747

UNITED STATES PATENT OFFICE 2,230,747

LIQUID COATING COMPOSITION AND METHOD OF PRODUCING THE SAME

Joel A. Greene, Miami Shores, Fla., assignor to Somay Products, Inc., Miami, Fla., a corporation of Florida Application November 27, 1939, Serial No. 306,376

6 Claims. (Cl. 134—46)

It is well-known to employ liquid or plastic coating compositions, such as hydraulic paints which contain Portland cement, for waterproofing structural cement, stucco and masonry surfaces; and many different compositions have been proposed for such paints, which depend for their action upon the setting or hardening properties of the cement, in conjunction with pore-filling properties of certain of the components which are employed in the composition, to impart waterproofing qualities to the surface to which the paint is applied.

Compositions of this kind are prepared and sold as dry mixes, in powder form, the material being intended to be mixed with cold water at the location of use. This is a necessary procedure, because the cement is included in the mixture and in the presence of water the composition would become a hard mass very shortly after compounding. Consequently, it is necessary to make and dispense these materials as dry powders, with instructions for mixing with suitable amounts of water at the job being painted.

There are certain objections inherent to the compositions heretofore employed for this purpose. It is very easy for the painter to add too small or too large a quantity of water to the amount of the paint material which he is using, thereby unduly accelerating or retarding the time of set of the paint and causing vairations in color. Further, many of the compositions are not sufficiently stable to produce lasting waterproofing qualities to the surface, and are deficient in waterproofing ingredients.

Additionally, many powder cement paints contain hygroscopic materials, such as sodium chloride and calcium chloride, these particular salts being included commonly in powder cement paints, and these materials have the tendency, particularly under conditions resulting from damp storage, to attract moisture in the manufacturer's container and combine with the lime and cement contained in the powder-paint formulations, which action is deleterious to the final set strength of the applied paint, in addition to lumping and decomposition of the powder paint in the container being caused by the hygroscopicity of the salts employed in the compounding thereof.

The present invention provides a hydraulic cement paint which avoids the above and other objections, and which is invariable in its applied properties.

In accordance with the present invention, there is produced an improved ready-mixed, ready-to-use fluid hydraulic cement paint composition, which is adapted to be applied to stucco and masonry surfaces for the purpose of imparting waterproof properties thereto.

One object of the present invention is to produce a product of the above-indicated character wherein there is provided a fluid paint base which contains as prepared the proper predetermined amount of water to produce definiteness of color and setting properties in the finished composition, thereby enabling the elimination of water additions at the location of the work.

A further object of the invention is to provide a fluid hydraulic cement paint of the above-indicated character wherein there is provided a separate supply of cement of proper predetermined amount for adding to the fluid base vehicle at the location of the work.

A further object of the invention is to provide a paint of the above-indicated character which possesses improved properties of stability and waterproofing.

A further object of the invention is to provide a paint of the above-indicated character which has a predetermined controlled time of set.

A still further object of the invention is to provide an improved process for producing a paint of the above-indicated properties.

A still further object of the invention is to provide, as an article of commerce, an improved paint package wherein the fluid base vehicle containing the properly determined amount of water is maintained separate from the cement component, which is present in the package in correct amount for mixing with the fluid vehicle at the location of the work to produce a finished paint having definite predetermined properties.

Further objects of the invention will become apparent as the description proceeds, and the features of novelty will be set forth in particularity in the appended claims.

Generally speaking, the present invention contemplates the production of an improved hydraulic cement paint for masonry and stucco surfaces, which is ready for use on the job by simply intermixing the proper amount of Portland cement provided in the paint package with the fluid paint vehicle contained therein in order to produce a finished paint having definite predetermined properties of stability and color, and controlled time of set. The package may be a two-compartment receptacle, one compartment of which contains the fluid base vehicle already mixed with the correct amount of water for the finished paint, the other compartment containing the proper amount of cement for mixing with the provided quantity of liquid base vehicle. The contents of the two compartments, of course, are sealed from one another in order to prevent access of water to the cement, and to avoid any premature introduction of any of the cement into the fluid base vehicle.

The invention will be understood more clearly from the accompanying drawing, the single view of which indicates a sectional elevation through an improved package embodied in the present invention.

Referring more particularly to the drawing, 2 represents a two-compartment can or similar two-compartment receptacle which may be of any suitable shape and type, the receptacle 2 being divided into two compartments indicated by 4 and 6, which are designed to keep their respective contents entirely separate, but wherein the receptacle defining compartment 6 prferably is removable when the can 2 is opened.

The compartment 4 contains the fluid base vehicle 8, while the compartment 6 contains the proper amount of cement 10 for mixing wtih the fluid base vehicle provided in the package. The compartment 6 is vapor-tight to prevent access of moisture to the cement contained therein, a sealing gasket 7 being included to assure complete tightness. A suitable cover or closure 12 closes the can 2.

In order to prepare the paint for use, it is only necessary to open the closure 12, remove the receptacle 6 from the can 2, and mix the cement contained therein with the previously prepared liquid base vehicle to produce a finished paint of predetermined controlled properties.

One of the objections to a dry-powder composition referred to above is the virtual impossibility of incorporating in powder materials sufficient water-repellant components for affording maximum protection for the surface to be covered, because in such proportions, powder paints cannot be mixed to smooth consistency on the job by hand.

On the other hand, in accordance with the present invention, all of the components except the Portland cement are thoroughly dispersed and incorporated in the correct quantity of water, by the manufacturer, so that, when the consumer is ready to apply the paint, it is merely necessary to add the dry Portland cement in the upper compartment of the can in which the paint is sold, to the fluid paint contained in the main or lower part of the can and proceed with the application thereof.

The following example is given to indicate illustratively a preferred composition of the present improved product, it being understood that the indicated composition is not intended to be restrictive as to the specific ingredients, or amounts, or proportions thereof.

The lower compartment 4 of the can 2 may contain the following composition:

| | Pounds |
|---|---|
| Hydrated finish lime | 33 |
| Calcium stearate | 1 |
| Pulverized sodium chloride | 5 |
| Magnesium silicate | 8½ |
| Water | 102 |
| Ammonium stearate | 1¼ |

The top compartment 6 may contain dry Portland cement to the amount of 32 lbs.

In the above composition, the magnesium silicate is used to assure good suspension qualities, it being inert chemically. The ammonium stearate is a waterproofing compound of high efficiency, and it can be incorporated only in a fluid or paste-prepared product, it being itself a paste. The calcium stearate and ammonium stearate contain the same acid radical—stearic acid. The calcium stearate is combined with lime by the manufacturer to form an impalpable powder which is extremely water-resistant. As a powder, its function is to fill the voids of the aggregates in the set film of paint. The emulsified ammonium stearate disperses the fatty acid in water, similar to the action of ordinary soap. In common soaps used for their detergent value, however, the alkalies used to form the emulsion are stable and the emulsion therefore is resoluble, whereas the ammonia in ammonium stearate is volatile, enabling the stearic acid to deposit in microscopic proportions, envelope and combine with the alkaline elements employed, and produce maximum efficiency in providing a power of repulsion to overcome and resist moisture absorption by the surface to which the paint is applied. The ability to incorporate ammonium stearate in the present process affords greater ease of brushing and enhanced self-leveling properties because of its action in reducing the surface tension of the paint. Because of its hygroscopicity, the salt absorbs moisture from the air and keeps the surface, to which the paint is applied, damp long enough to cure the cement. Thus, the salt or other equivalent hygroscopic material is especially advantageous where the paint is used as a coating for stucco or masonry surfaces and the like which aas usually dry and adsorbent, and insures the presence of an initial amount of moisture which is necessary to cause the cement to harden.

In preparing the liquid base vehicle contained in the lower compartment 4, all of the dry ingredients are assembled and put into a dry powder mixer, and thoroughly mixed and dispersed for not less than thirty minutes, this time being required because of the relatively large amount of metallic soap (calcium stearate) that is employed.

A solution is made in a separate container of water and ammonium stearate. The ammonium stearate is approximately 1¼ lbs. by weight, with sufficient water to make about a 12½% emulsion. When the ammonium stearate solution has been prepared, the powder which has been mixed, as described above, and the ammonium stearate solution are added, alternately, to a heavy-duty paste mixer, until both the dry and liquid mixtures are all in. The resulting hydraulic paint composition is freely fluid and may be applied to a surface to be covered thereby by spraying or brushing.

The procedure of adding the mixtures alternately is necessary in order to prevent flotation of the powdered calcium stearate when water is added. During mixing, if the balance is not properly maintained between the liquid and the dry ingredients, an incomplete dispersion results.

By dispersing the salt, water-repellant, lime, and the other components except the cement, in the correct quantity of water at the factory, the quality of the lime is improved by slaking over a period of time as contrasted to the insufficient slaking period allowed in a powder paint which must be applied within a few hours after mixing because of the relatively quick setting properties thereof. The water-repellant is assimilated readily in the present improved paint because of the great mixing and shearing power of machinery as compared to the limited power it is possible to exert on a powder paint by hand.

By the improved method and composition of the present invention there are enabled to be incorporated therein emulsified stearic acid and other fluid water-repellants in the paint which impart enhanced brushing and self-leveling or flowing qualities to the product. This fluid water-repellant also envelopes the aggregates of the mixture, yielding greater water resistance in the set and seasoned film.

It will be understood that the liquid mixture in the lower compartment 4 is a true paint, but it does not become a hydraulic paint, or Portland cement paint, until the cement in the upper compartment has been added to the paint in aqueous dispersion in the lower compartment. That is to say, the liquid base vehicle is a kind of whitewash which hardens upon drying and absorption of carbon dioxide of the air, in common with the reactions of all whitewashes; but, after the cement in the upper compartment has been added thereto, the paint assumes a definite initial set of two hours and hardens while wet (hydraulic set) due to the formation of insoluble silicates. The time of initial set and the ultimate durability of the paint are both enhanced in proportion to the extent to which the cement is used; and by suitably varying the proportions of the components, the time of set may be controlled as desired for fulfilling any given specifications.

The paint made and packed as described herein may be produced from slaked quick-lime or hydrated lime, using any form or type of hydraulic cement, such as Portland cement or puzzolan cement, and emulsified or combined metallic soap or other water-repellant and any form of hygroscopic salt in a two-compartment can or separate cans or other containers. Consequently, it will be apparent that the invention is not limited to the specific disclosures herein made, but that various changes may be made therein which will become apparent readily to anyone skilled in the art to which this invention appertains; and that, therefore, it is intended and desired to embrace within the scope of the invention such modifications and changes as may be necessary to adapt it to varying conditions and uses. Thus, for example, instead of calcium and ammonium stearates, there may be employed in whole or in part corresponding salts of other higher fatty (soap-producing) acids, such as oleic acid or palmitic acid, for example; calcium chloride may be used in whole or in part for the sodium chloride.

What I claim as new and desire to secure by Letters Patent is:

1. The method of producing a waterproof hydraulic cement paint which comprises preparing a mixture of a material acting both as a pigment and as a spreading agent, a water-proofing material, a hygroscopic set-accelerating material, an emulsifier, and a set-retarding material, adding water to the said mixture until a freely flowing liquid mixture results, preparing a dry component consisting essentially of Portland cement, and mixing the cement and liquid mixture while proportioning the mixing to produce a finished paint product which is freely flowable.

2. The method of producing a waterproof hydraulic cement paint which comprises producing a mixture containing an excess of hydrated lime, the said lime acting both as a pigment and as a covering agent in the final product, with smaller but effective amounts of calcium stearate as a water-proofing material, sodium chloride as both a set-accelerating material and a gel-inhibiting material, ammonium stearate as an emulsifier, and magnesium silicate as a set-retarding material, adding water to the said mixture until a freely flowing component mixture results, preparing a component consisting essentially of Portland cement, and mixing the cement and liquid mixture in proportions for producing a freely-flowable liquid finished paint product.

3. The method of producing a freely-flowing hydraulic cement paint which comprises preparing as a component of the finished paint with a liquid mixture consisting of an aqueous mixture including the following ingredients in proportions substantially as represented by the following amounts: hydrated lime, 33 lbs., calcium stearate, 1 lb., sodium chloride, 5 lbs., magnesium silicate, 8½ lbs., ammonium stearate, 1¼ lbs., water, 102 lbs., preparing a dry component consisting essentially of Portland cement in the proportion of approximately 32 lbs. for the above-described liquid mixture, and mixing the cement and the liquid mixture in proportions resulting in a freely-flowing liquid paint product.

4. As a component for the production of hydraulic paints, a liquid mixture consisting of an excess of hydrated lime, with smaller but effective amounts of calcium stearate, sodium chloride, magnesium silicate, and ammonium stearate, the said mixture being incorporated in sufficient water to produce a freely-flowing liquid product adapted to be mixed with a dry component consisting of Portland cement, for producing a freely-flowing finished paint product.

5. As a component for the production of hydraulic paints, a liquid mixture consisting essentially of the following ingredients in proportions substantially as represented by the following amounts: hydrated lime, 33 lbs., as a pigment and spreading agent; calcium stearate, 1 lb., as a water-proofing material; sodium chloride, 5 lbs., as a set-accelerating and gel-inhibiting material; magnesium silicate, 8½ lbs., as an inert set-retarding material; ammonium stearate, 1¼ lbs., as an emulsifier; water, 102 lbs., to produce a freely-flowing material, the resulting freely-flowing mixture being adapted to be mixed with a dry component consisting of Portland cement for producing a freely-flowing finished paint product adapted to be sprayed or brushed onto a surface to be covered thereby.

6. The method of producing a freely-flowing hydraulic cement paste which comprises preparing a dry mixture comprising the following ingredients in approximately the proportions indicated by the amounts: hydrated lime, 33 lbs.; calcium stearate, 1 lb.; sodium chloride, 5 lbs.; magnesium silicate, 8½ lbs.; producing an aqueous emulsion containing 1¼ lbs. of ammonium stearate and 102 lbs. of water, mixing the resulting ammonium stearate emulsion with the aforesaid dry mixture by adding alternately the said dry mixture and the ammonium stearate emulsion to a suitable mixer, mixing the said constituents until a homogeneous freely-flowing slurry is produced and intermixing the resulting slurry with dry cement in proportions producing a freely-flowing liquid paint product adapted to be applied to a surface to be covered thereby by spraying or brushing.

JOEL A. GREENE.